United States Patent [19]

Smith

[11] Patent Number: 4,903,158

[45] Date of Patent: Feb. 20, 1990

[54] MR HEAD WITH COMPLEMENTARY EASY AXIS PERMANENT MAGNET

[75] Inventor: Neil Smith, San Diego, Calif.

[73] Assignee: Eastman Kodak Company, Rochester, N.Y.

[21] Appl. No.: 225,418

[22] Filed: Jul. 28, 1988

[51] Int. Cl.⁴ .......................... G11B 5/127; G11B 5/33
[52] U.S. Cl. .................................................. 360/113
[58] Field of Search ............. 360/113, 110; 338/32 R; 324/252

[56] References Cited

U.S. PATENT DOCUMENTS

| | | | |
|---|---|---|---|
| 3,881,190 | 4/1975 | Brock et al. | 360/113 |
| 4,052,748 | 10/1977 | Kuijk | 360/113 |
| 4,103,315 | 7/1978 | Hempstead et al. | 360/110 |
| 4,122,505 | 10/1978 | Kuijk | 360/113 |
| 4,141,051 | 2/1979 | Kuijk et al. | 360/113 |
| 4,142,218 | 2/1979 | Gorter | 360/113 |
| 4,191,977 | 3/1980 | Lewkowicz | 360/66 |
| 4,195,323 | 3/1980 | Lee | 360/113 |
| 4,321,641 | 3/1982 | Lee | 360/126 |
| 4,489,484 | 12/1984 | Lee | 29/603 |
| 4,535,375 | 8/1985 | Mowry et al. | 360/113 |
| 4,547,824 | 10/1985 | Best et al. | 360/113 |
| 4,556,925 | 12/1985 | Suenaga et al. | 360/113 |
| 4,580,175 | 4/1986 | Mowry et al. | 360/113 |
| 4,623,867 | 11/1986 | Lundquist et al. | 360/113 |
| 4,660,113 | 4/1987 | Nomura et al. | 360/113 |
| 4,755,897 | 7/1988 | Howard | 360/113 |
| 4,809,109 | 2/1989 | Howard et al. | 360/113 |

FOREIGN PATENT DOCUMENTS

| | | | |
|---|---|---|---|
| 0220241 | 12/1983 | Japan | 360/113 |
| 0157712 | 8/1985 | Japan | 360/113 |
| 0134913 | 6/1986 | Japan | 360/113 |

OTHER PUBLICATIONS

Bajosek et al., "Cobalt—Chromium Films for Hard Magnetic Biasing of Magnetoresistors and for Magnetic Recording Medium," IBM TDB, Mar. 1979, vol. 21, No. 10, pp. 4239–4240.

Primary Examiner—Stuart N. Hecker
Assistant Examiner—David J. Severin
Attorney, Agent, or Firm—Robert F. Cody

[57] ABSTRACT

The invention teaches the use of a permanent magnet easy axis biasing structure having the same (or nearly so) physical geometry as the MR sense film itself, whereby a similar, but opposite, demagnetization field is generated in the biasing structure as is generated in the sense film. Thus, with the two demagnetization fields complementarily cancelling each other, any tendency of the sense film for multi-domain formation therein is cancelled (or at least lessened).

8 Claims, 2 Drawing Sheets

MR HEAD WITH COMPLEMENTARY EASY AXIS PERMANENT MAGNET

BACKGROUND OF THE INVENTION

1. Field of the Invention

This invention relates to magnetoresistive (MR) heads for use in the playback of magnetically recorded signals. More particularly, the invention relates to MR heads of the type, often referred to as UMR heads, wherein an elongated thin film is brought into direct contact with a recording medium and, in response to signals recorded in the medium, signal current flowing the length of the film is caused to vary.

The invention, as well as the prior art, will be described with reference to the figures, of which FIG. 1 is a diagram illustrating a prior art practice utilizing an MR playback head, FIGS. 2a-2c are diagrams useful in describing apparatus according to the invention, FIG. 3 is a diagram useful in teaching a problem addressed by means of the invention, FIG. 4 is a diagram illustrating the structure of a magnetic head according to the invention, and FIG. 5 is a diagram illustrating the efficacy of the invention.

2. Description Relative to the Prior Art

In the interest of describing the state of the art, as well as the PROBLEM addressed by the invention, reference should first be had to the UMR head of FIG. 1: A sense current i is passed through an MR sense film 10 via contacts 12, 14. In response to signal information magnetically recorded in a recording track 16, the resistance of the film 10 varies to cause the voltage drop across the film to vary accordingly. As is fairly conventional, source of hard (vertical) axis bias field, provided for through a variety of means, biases the ordinarily longitudinal moment to an orientation, as depicted.

FIGS. 2a-2c depict schematically various typical domains which may be associated with the film 10 of FIG. 1. In response to a recorded signal field $M_s$, the domain walls will move, expand, and contract; and, as is known, such domain variations are manifested as signal noise, viz. Barkhausen noise.

The elimination of Barkhausen noise problem may be achieved, for example, by significantly extending the length of an MR film, whereby only a wall-free single domain may intrinsically coact with a track. This can be a valid solution to the Barkhausen noise problem, but it is restricted, realistically, to head configurations wherein only a single record track is read at a given time, or a given track configuration with a significantly wide track width ($\geq 200\mu m$).

U.S. Pat. No. 4,547,824 discusses another technique for ridding an MR sense film of a plurality of magnetic domains, viz. by applying an easy axis bias field along the longitudinal axis of the film, whereby domain walls are swept from the active area of the film. Thus, with but a single domain existing in the film, Barkhausen domain movement is intrinsically impossible. Such an easy axis bias field is complementary to the aforenoted "moment-biasing" hard axis field usually applied in the plane of the film perpendicular to the longitudinal axis of the film.

The success of an easy axis "longitudinal" field in removing domains and accompanying Barkhausen noise in an MR sense film is due to the cancellation, by the easy axis field, of the demagnetization field associated with the MR sense film. If the MR sense film were, however, truly in a single domain state, its demagnetization field would, intrinsically, be highly non-uniform, being much larger at its ends than at its center. Thus, were a uniform easy axis field, as practiced in the prior art, to be employed to quash Barkhausen noise, it goes without saying that true cancellation of the demagnetization fields throughout the sense film would not, as a practical matter, be possible: at best one could only achieve demagnetization field cancellation over a limited central location of the film, similar to that shown in FIG. 3. (Note: To cancel demagnetization fields near the ends requires a uniform easy axis field which is much larger than necessary in the middle of the film due to non-uniformity in the demagnetization field. This can significantly reduce sensor sensitivity to signal fields.) As indicated, the sense film of FIG. 3, as magnetized, consists of a central uniformly magnetized region 20, with complex domain closure structures at the ends 22, 24. Provided these structures remain at their respective ends—and especially if they remain under their respective current contacts (12, 14)—they produce no spurious noise in the information signal associated with the MR sense film 10. There is a danger, however, that the closure structures are not always sable, and may propogate into the active central region 20 of the film 10 under the action of the applied signal field associated with the track 16. Indeed, the problem becomes progressively more severe for MR sense films which correspond to narrow magnetic track widths, typically those less than 100 microns in width.

SUMMARY OF THE INVENTION (PROBLEM SOLUTION)

To reconcile the above-indicated problem, the invention teaches the use of a permanent magnet easy axis biasing structure having the same (or nearly so) physical geometry as the MR sense film itself, whereby a similar, but opposite, demagnetization field is generated in the biasing structure as is generated in the sense film. Thus, with the two demagnetization fields complementarily cancelling each other, any tendency of the sense film for multi-domain formation therein is cancelled (or at least lessened).

DETAILED DESCRIPTION

Figure 1:
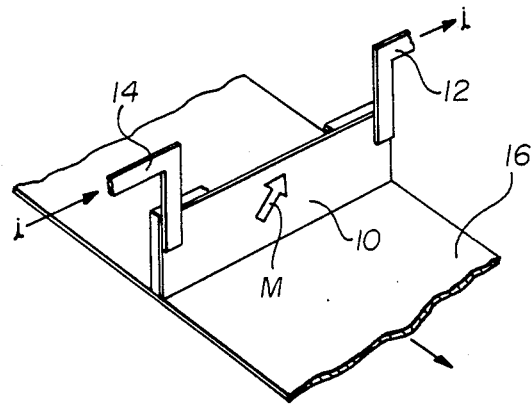
Figure 2A:
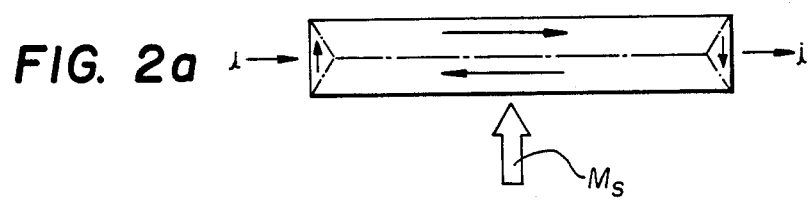
Figure 2B:
Figure 2C:
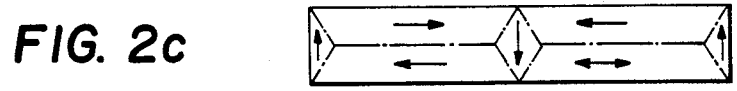
Figure 3:
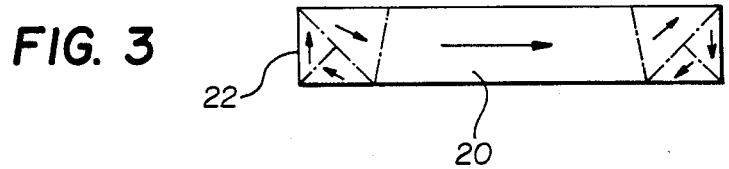

In the interest of clarity, it is thought best to describe a magnetic head according to the invention in terms of the way in which such head is fabricated. See FIG. 4:

Given a non-magnetic substrate 30 comprised of, say, a ceramic such as fosterite, a layer 32 of magnetically soft material such as permalloy is deposited on the substrate 30 by any well-known technique. Atop the permalloy layer 32, a magnetic insulating coating 31 of, for example, $SiO_2$, is deposited. After the $SiO_2$ coating is in place, a magnetoresistive sense film 33, typically of permalloy to about 400 Å thick, is deposited atop the $SiO_2$ coating 31. Electrical bonding pads 34, 36 are then deposited atop the sense film 33 for conveying electrical current through the magnetoresistive film 33. (As is known, electrical current through the sense film 33 magnetizes the layer 32 so as to set up a hard axis bias field which biases the moment of the film 33 at about 45° relative to the direction of current flow, whereby magnetic signals recorded in a record track 38 may—given constant current through the film 33—cause voltage variations across the film 33 that are the analogs of such recorded magnetic signals.)

Figure 4:
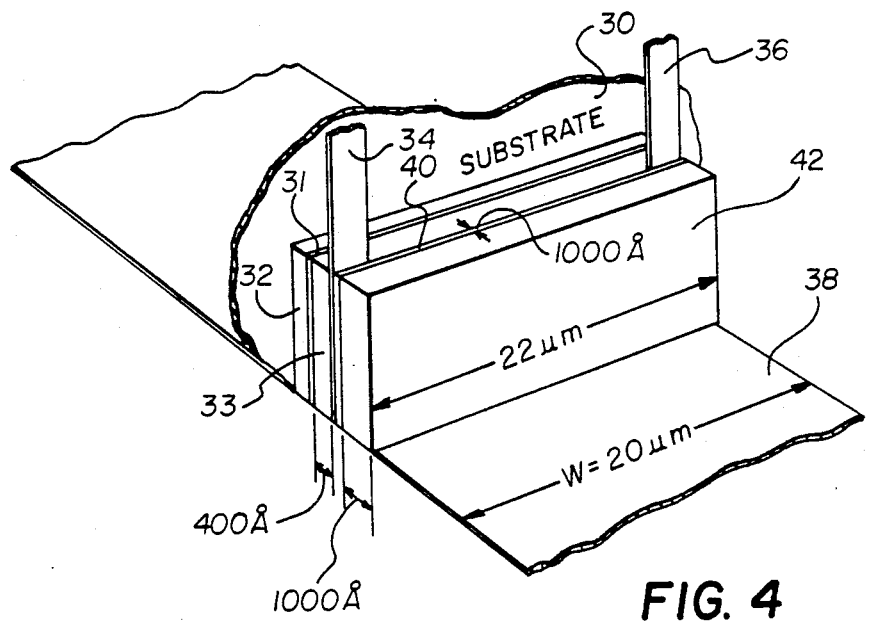

A thin coating 40 of $SiO_2$ is then deposited on the sense film 33; and thereafter a layer 42 of magnetically hard material, preferably to a thickness of about 1000 Å, is deposited atop the $SiO_2$ coating 40. With the magnetically hard layer 42 in place, the assembly of FIG. 4 is exposed to a strong magnetic field $H_1$ so as to magnetize permanently the layer 42. The MR sense film is then exposed to a magnetic field $H_2$, weaker than $H_1$ and opposite in direction to $H_1$ so that the magnetic moment of the MR film is oriented in the direction of the external magnetic field of the hard layer 42.

Figure 5:
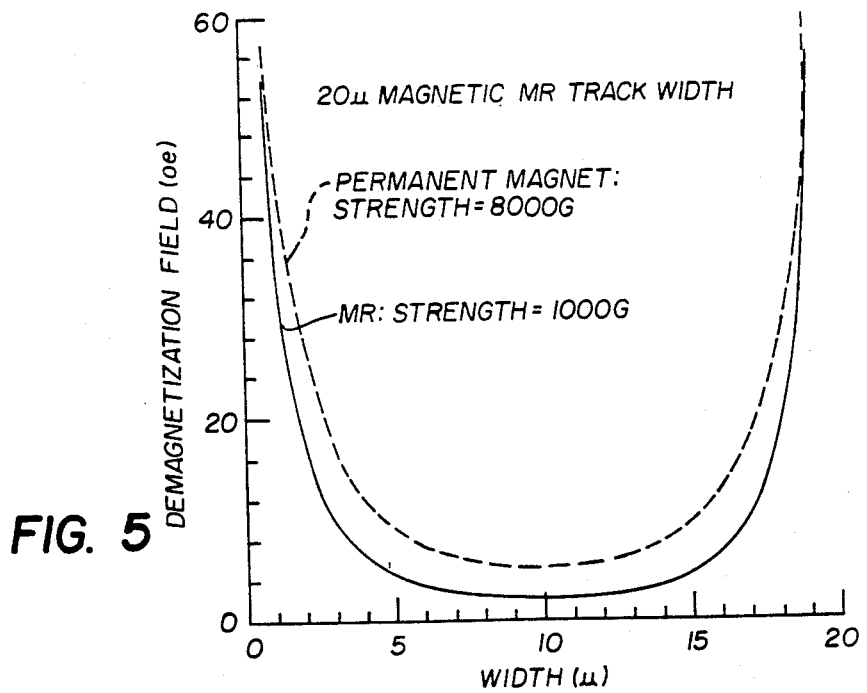

Reference should now be had to FIG. 5 which depicts curves corresponding to the demagnetization fields for the MR sense film 33 and for the permanently magnetized layer 42. As will be appreciated, the demagnetization fields associated with the permanently magnetized layer 42 approximates the demagnetization field of the MR sense film 33 over the great majority of the trackwidth and, accordingly, effectively cancels the demagnetization field of the MR sense film to preclude Barkhausen noise without excessively desensitizing the MR sense film with excess easy axis field in the central region thereof as stated above.

The invention has been described in detail with particular reference to a presently preferred embodiment, but it will be understood that variations and modifications can be effected within the spirit and scope of the invention.

What is claimed is:

1. A magnetoresistive head for use in the playback of magnetically recorded signals comprising
    a. a magnetoresistive sense film having a given geometric configuration,
    b. means for supporting said magnetoresistive sense film,
    c. said magnetoresistive sense film having a longitudinal magnetization component which results in a demagnetization field in said magnetoresistive sense film.
    d. means for conveying a sense current from one portion of said magnetoresistive sense film to another thereof,
    e. permanent magnet means having essentially the same geometric configuration as said magnetoresistive sense film, and
    f. means for so electrically insulating said permanent magnet means from said sense film that said permanent magnet means substantially overlays said magnetoresistive sense film wherein the magnetic field of said permanent magnet means is so coupled to said magnetoresistive sense film to substantially cancel said demagnetization field in said magnetoresistive sense film, thereby to reduce Barkhausen effects in said magnetoresistive head.

2. The magnetoresistive head of claim 1 wherein said permanent magnet means is a coating of magnetically hard material that is magnetized in the direction of the length of said magnetoresistive sense film.

3. The magnetoresistive head of claim 2 wherein the coating of said permanent magnet means is a coating of approximately 1000 Å thick.

4. The magnetoresistive head of claim 2 further comprising
    a. a magnetically soft layer, and
    b. means for so electrically insulating said layer from said magnetoresistive sense film that current through said magnetoresistive sense film biases the moment of said sense film.

5. In a magnetoresistive head of the type having
    a. support means
    b. a thin film magnetoresistive element having a demagnetization field associated therewith, said magnetoresistive element supported by said support means and having a given geometric configuration, the improvement comprising
        a. non-magnetic means supported by said thin film magnetoresistive element, and
        b. permanent magnet means supported by said non-magnetic means, said permanent magnet means having essentially the same general configuration as said magnetoresistive element and further having the direction of its magnetic field at said magnetoresistive element opposed in direction to said demagnetization field, said permanent magnet means being in essentially perfect registry with said magnetoresistive element.

6. The improved magnetoresistive head of claim 5 wherein
    a. said magnetoresistive element and
    b. said permanent magnet means are elongated structures.

7. The improved magnetoresistive head of claim 6 wherein said permanent magnet means is a deposition of magnetically hard material, on said non-magnetic means, that has been magnetized in the direction of the length of said permanent magnet means.

8. The improved magnetoresistive head of claim 7 wherein said deposition of magnetically hard material has a thickness that is less than 1000 Å.

* * * * *